No. 783,031.

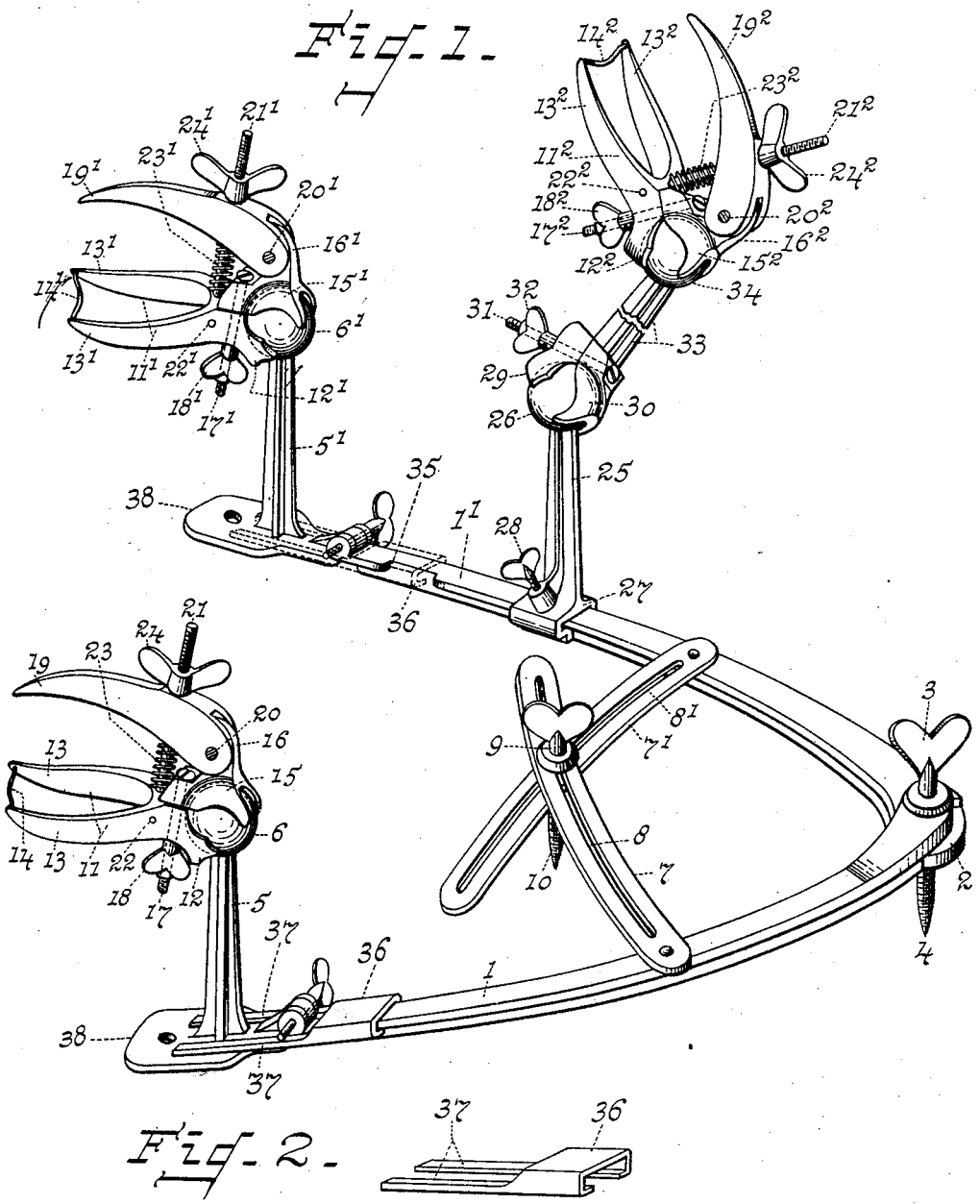

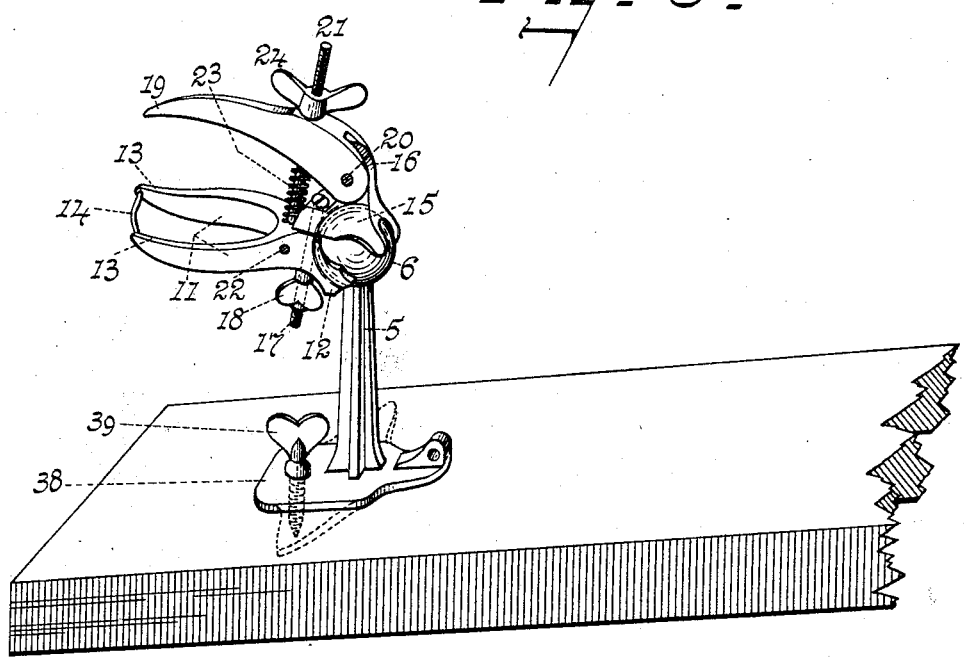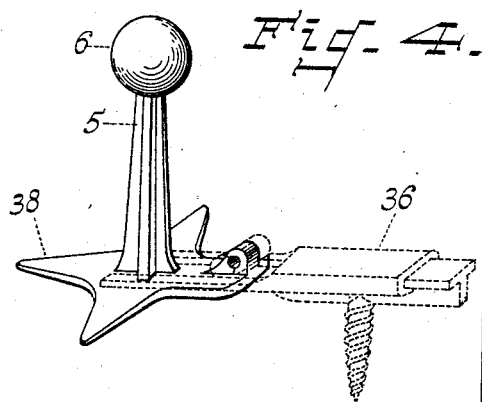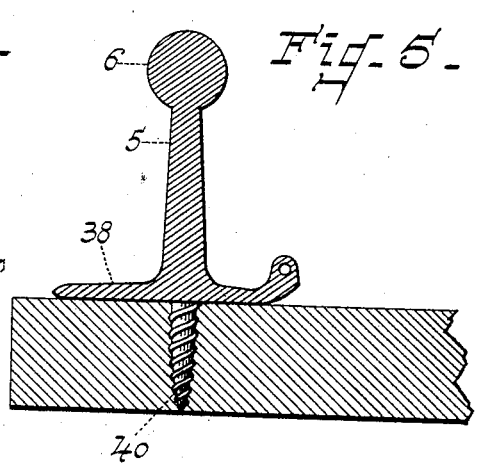

Patented February 21, 1905.

UNITED STATES PATENT OFFICE.

ELMER M. FELL, OF AUBURN, NEW YORK.

PIPE-SUPPORTING DEVICE.

SPECIFICATION forming part of Letters Patent No. 783,031, dated February 21, 1905.

Application filed April 2, 1904. Serial No. 201,273.

*To all whom it may concern:*

Be it known that I, ELMER M. FELL, a citizen of the United States, residing at Auburn, in the county of Cayuga and State of New York, have invented new and useful Improvements in Pipe-Supporting Devices, of which the following is a specification.

My invention relates to an improvement for the carrying or support of piping or sections thereof in proper relative position for the purpose of uniting or joining the same to each other by any desired method; and the object of my invention is to hold and support piping or sections of the same securely in position desired without danger of displacement while the joining of the same is being fashioned or made. I accomplish this object by the mechanism arranged and shown in the accompanying drawings, in which—

Figure 1 is a perspective view of my device. Fig. 2 is a perspective view of one of the sliding loops or ties provided near the outer hinged ends of the limbs. Fig. 3 is a perspective view of one of the posts carrying the jaws and secured by a set-screw to a board for use by itself. Fig. 4 is a perspective view of one of the posts with the jaws removed and having a modified form of foot, the dotted lines showing the hinged end of the limb, the sliding loop thereon, and a threaded screw formed on the under side of said limb; and Fig. 5 is a section of one of the posts, provided on the under side of its base with a threaded screw supporting it in position on a board, the jaws being removed from said post.

Similar reference figures refer to similar parts in the several views.

Heretofore when it has been desired to join two sections of piping, especially under conditions where it is already arranged and fixed in place, it has been customary to arrange the sections to be joined by building up from any convenient material, supports beneath them and then to join them by a so-called "wipe-joint" or otherwise, during which process unless some degree of care is exercised the said supporting material is liable to be disarranged, thus causing much vexatious annoyance and delay in the progress of the work and loss of time to the operator. I aim to obviate these objectionable features by providing a device which, while supporting the sections of piping in proper relative position for being joined together, may of itself be fixed in such position as shall insure the stability of the whole. To this end and referring to the drawings forming part of this specification, reference is had to Fig. 1, in which I provide two limbs 1 1', which may be slightly curved, if so desired, and of a T shape in cross-section, as shown, and pivoted together at one end with a rule-joint 2, having a set-screw 3, provided with a thumb-piece and a gimlet screw-point 4 for entering a board or the adjacent flooring or timber-work. On the outer ends of the limbs 1 1' are hinged the posts 5 5', which are at vertical right angles thereto and are terminated with balls 6 6', the purpose of which will presently be explained. The said limbs 1 1' are provided at a proper interval from their pivoted ends with the swing-pieces 7 7', which are provided with the slots 8 8', in which is passed a set-screw 9, having a thumb-piece and an extended gimlet screw-point 10, as shown, for screwing into a board, the floor, or otherwise, as convenient. The object of the swing-pieces, it will be seen, is to afford means for the spreading of the limbs and the fixing of the same in desired place, as clearly shown in Fig. 1. A sliding loop or tie 36 is arranged near the hinged ends of the limbs 1 1' and is provided with projecting fingers 37 37, as shown clearly in Figs. 1 and 2, the object of which is to render the hinge-point rigid when so desired, as will hereinafter be explained.

A foot 38 is provided at the bottom end of each of the posts 5 5' and is hinged to the outer ends of the limbs 1 1', as shown in Fig. 1, thus enabling the said posts, with their several attachments, to be folded backward on their respective limbs in compact shape when not in use. A set-screw 39, as seen in Fig. 3, or a threaded screw-point 40, cast on the under side thereof, as shown in Fig. 5, serves to secure the said feet to the board, flooring, or timber when so desired. It will be seen that the said feet of said posts may be of any desired form that will serve as a substantial basic support for the same and keep them in desired vertical position when the device is in use.

A lower jaw 11, having a socketed end 12, embracing a portion of the periphery of the ball 6 on the top end of the post 5 and extended into the forks 13 13, is provided, said forks 13 13 being connected at or near their ends by a somewhat downwardly curved tiepiece 14, the object of which will be presently explained. A socket-piece 15, fitting on the periphery of the ball 6 and extended into a lug 16, is secured to the socketed end 12 of the said lower jaw 11 by means of the bolt 17 and a thumb-nut 18, screwing thereon. An upper jaw 19 is pivoted at one end on the lug 16 of the socket-piece 15 by a suitable pivot-pin 20, as plainly shown. A bolt 21 is next provided, the lower end of which is pivoted near the socketed end of the lower jaw 11, as shown at 22. The bolt 21 is provided between the lower and upper jaws with a spiral spring 23 and is upwardly extended through the upper jaw 19, where it is provided with a thumb-nut 24. By this arrangement of parts it will be seen that the action of the spiral spring is to keep the said jaws thrown apart or open, while the screwing down of the thumb-nut on the bolt presses them toward each other.

The post 5', having the ball 6' and erected near the end of the hinged limb 1', is provided with parts in every respect identical with those already described and are referred to by like reference-figures, supplemented by the integer "1."

A post 25 is next provided, having a ball 26 on its top end and a foot 27, which grasps the T-shaped limb 1' and on which it can be moved forward or backward, as desired. A set-screw 28 serves to screw the same on the limb 1' in such position as may be found necessary. A socket-piece 29 and a socket-piece 30 are provided on the ball 26 and held in desired place thereon by a bolt 31, which is furnished with a thumb-nut 32, as plainly shown. The socket-piece 30 is extended into a post 33, which is also provided with a ball 34 and may be of any desired length. A notch 35, formed at one side of the limb 1', near its outer end, serves to admit the foot 27 to its place thereon. The ball 34 of the post 33 is provided with appliances identical with those on the balls 6 and 6' of the posts 5 and 5' and are represented by similar figures of reference, supplemented by the integer "2," thus: 11², which refers to the lower jaw of the same.

Having thus described the several parts of my improvement, I will now set forth the operative functions of the same. When it is found desirable to join two sections of piping together, especially in confined spaces or under conditions where the piping is already laid by a wipe-joint particularly, the limbs 1 1' are laid on the flooring and spread to the desired extent, when they are secured in position by forcing the points of the set-screws 3 and 9 into the said flooring and screwing the same home. The pipe-sections are next placed between the jaws of the posts 5 and 5', respectively, the ball-and-socket joints formed by the balls and the socket-pieces rendering any desired alinement of the sections feasible, as well as fixed, when the thumb-nuts 18 18' and 24 24' are screwed home, the former tightening the sockets on the balls and the latter forcing down the upper jaws 19 19' upon their respective pipe-sections and holding them firmly in the desired contiguity for the purpose of wiping the joint.

Certain conditions arise in which it is found necessary to join pipe-sections having nut-couplings, &c., and end on in the said jaws. When such is the case, the tie-pieces 14 14' of the forks 13 13' afford a rest or stop for the same, as will be readily seen. At other times also it is found convenient and feasible to use the posts carrying the jaws singly and detached from the pivoted limbs, which condition is illustrated in Fig. 3, in which a set-screw secures the foot of the said post to a board, and in Fig. 5, where the said foot of said post is provided on its under side with a screw-point which can readily be screwed into a board or otherwise, as shown. A similar screw-point can, if so desired, be formed on the under side of the outer end of the limbs, as shown in dotted lines in Fig. 4. In the latter case no fastening need be used for the foot of the post carrying the jaws, the movable sliding loop passing over the hinge-point and its prongs or arms resting on said foot of said post, assuring proper rigidity, the said foot being formed broad enough to assure the post from racking sidewise. Under the conditions referred to it will be seen, referring to Fig. 1, that the said sliding loop 36, moving on the ends of the limbs 1 1' behind the hinge-point of the same, is assured of its place thereon by being bent over at its sides upon and under the edges of said limbs and which on being forced outward toward said hinge-point the prongs or arms thereof are passed over and upon the upper side of the feet 38 and at either side of the posts 5 5', thus preventing the flexing backward of said posts and feet at the hinge-point between the ends of said limbs and the feet of said posts when they may be resting on the boarding or other support.

When it is desired to wipe a joint on a pipe at an angle to the line of piping or sections being held in position as has been described, the post 25, with its several attachments and connections, is brought into use and adjusted so as to meet the requirements of the case, the jaws of the post 33, socketed on the ball 26 thereof, holding the angled pipe in precisely the same manner as the jaws socketed on the posts 5 5', already described. It will thus be seen that great latitude for angular adjustment is afforded through the ball-and-socket joint provided on the top of the movable post 25 and the ball-and-socket joint provided on the jaw end of the post 33.

Having thus described the several parts of my improvement, as well as the operation of the same, what I claim, and desire to secure by Letters Patent of the United States, is—

1. In a pipe-supporting device pivoted T-shaped limbs having swinging pieces adapted to control the opening and closing of the same, a notch and sliding loops or ties and means for securing said limbs to a board or otherwise, with vertical posts hinged to the ends thereof having a foot at the bottom ends and a ball at their top ends carrying jaws with a spiral spring between them and also adapted to be secured to a board or otherwise, and a vertical post having a foot movable on said limb or limbs and a ball at the top end carrying jaws with a spiral spring between them and means for securing said foot of said vertical post in desired place on said limb or limbs substantially constructed in the manner and for the purpose herein shown and described.

2. In a pipe-supporting device, pivoted T-shaped limbs 1, 1', having a pointed set-screw 3, swinging pieces 7, 7', having slots 8, 8', and the pointed set-screw 9, the sliding loops or ties 36, and means for securing the same to a board or otherwise combined with the vertical posts 5, 5', having feet 38, hinged to the ends of said T-shaped limbs and adapted to be secured to a board or otherwise, balls 6, 6', at the top ends carrying the forked lower jaws 11, 11', provided with tie-pieces 14, 14', pivoted bolts 21, 21', having thumb-nuts 24, 24', and socketed ends 12, 12', the socket-pieces 15, 15', having lugs 16, 16', secured to said forked lower jaws and the upper jaws 19, 19', pivoted on said lugs 16, 16', with spiral springs 23, 23', carried on said pivoted bolts between said jaws substantially in the manner and for the purpose herein shown and described.

3. In a pipe-supporting device the combination of the pivoted T-shaped limbs 1, 1', having a pointed set-screw 3, swinging pieces 7, 7', having slots 8, 8', and the pointed set-screw 9, the notch 35, the sliding loops or ties 36, and means for securing the same to a board or otherwise, and the vertical posts 5, 5', having feet 38, hinged to the ends of said T-shaped limbs and adapted to be secured to a board or otherwise, balls 6, 6', at the top ends carrying the forked lower jaws 11, 11', provided with tie-pieces 14, 14', pivoted bolts 21, 21', having thumb-nuts 24, 24', and socketed ends 12, 12', the socket-pieces 15, 15', having lugs 16, 16', secured to said forked lower jaws, and the upper jaws 19, 19', pivoted on said lugs 16, 16', with spiral springs 23, 23', carried on said pivoted bolts between said jaws with the post 25, having the foot 27, adapted to pass in said notch 35, of one of said limbs, a set-screw 28, and a ball 26, the socket-piece 29, the socket-piece 30, having an arm 33, provided with a ball 34, and bolted to each other on said ball 26, and the forked lower jaw 11$^2$, having a tie-piece 14$^2$, a pivoted bolt 21$^2$, a socketed end 12$^2$, the socket-piece 15$^2$, having a lug 16$^2$, and bolted to said forked lower jaw, the upper jaw 19$^2$, pivoted on the lug 16$^2$, and the spiral spring 23$^2$, between said jaws on said pivoted bolt 21$^2$, substantially constructed and arranged in the manner and for the purpose herein described and shown.

In testimony whereof I have signed my name to this specification in the presence of two subscribing witnesses.

ELMER M. FELL.

Witnesses:
ROBERT J. BURRETT,
FRANK R. RATHBUN.